J. B. BROWN & J. PENTREATH.
Plow-Point.
No. 220,270.   Patented Oct. 7, 1879.
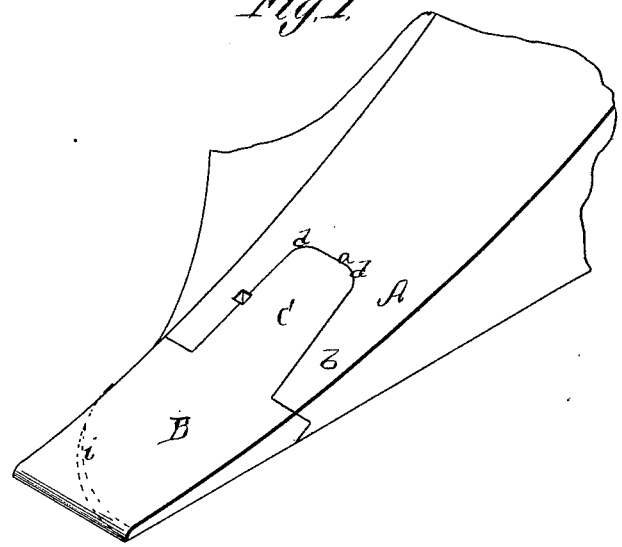
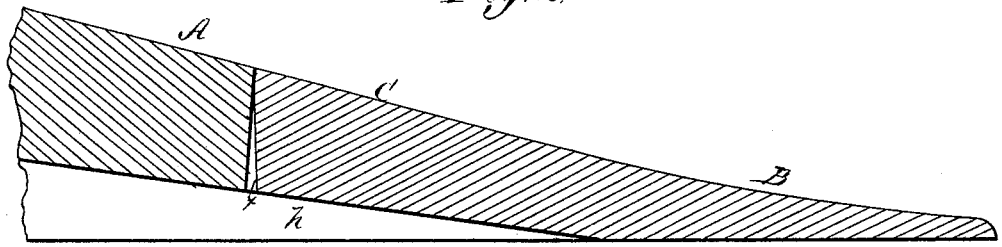
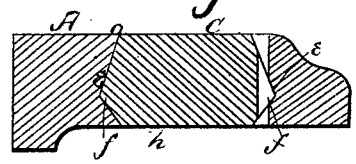

UNITED STATES PATENT OFFICE.

JAMES B. BROWN, OF NEW YORK, AND JOHN PENTREATH, OF YONKERS, N. Y.

IMPROVEMENT IN PLOW-POINTS.

Specification forming part of Letters Patent No. 220,270, dated October 7, 1879; application filed July 8, 1879.

*To all whom it may concern:*

Be it known that we, JAMES B. BROWN, of New York city, and JOHN PENTREATH, of Yonkers, in the county of Westchester, all in the State of New York, have invented certain new and useful Improvements in Plow-Points; and we do hereby declare that the following is a full, clear, and exact description thereof, reference being had to the accompanying drawings, and to the letters of reference marked thereon, which form part of this specification.

Our invention relates to that class of plow-shares and points, or slip-shares, in which a vertical slot is made through the share for the reception of a shank projecting from the point; and it consists in certain peculiarities of construction, as will be hereinafter more fully set forth, and pointed out in the claims.

In order to enable others skilled in the art to which our invention appertains to make and use the same, we will now proceed to describe its construction and operation, referring to the annexed drawings, in which—

Figure 1 is a perspective of our point. Fig. 2 is a vertical section, and Fig. 3 a cross-section, of the same.

A represents the plowshare, formed with a vertical slot, $a$, in its end. B is the plow-point or slip, provided with shank C, to enter the slot $a$ in the share.

The shank C is equal-sided, and the slot $a$ of the share is of equal width, which is of great advantage in molding over the tapering shank and wedge-shaped slot, as used in other cases.

The shank C runs in an oblique direction from the point or slip, which gives a thicker outside jaw or wall of slot in the share, as shown at $b$, making the strain or breaking pressure more equal in the two sides of the share.

At the base of the slot $a$ the corners are rounded, as shown at $d$, and the corners at the extreme end of the shank are shaped to correspond, which diminishes the danger of breaking the outer walls of the slot.

The shank C is on its sides provided with ridges or ribs $f$, which fit in corresponding grooves in the sides of the slot $a$; or these ribs and grooves may be reversed, if desired.

The ribs $f$ and grooves $e$ are not central, but are made heaviest on top, because the strain on a plow-point is such as to make it more liable to break out above than below, and this part of our invention obviates such difficulty.

The extreme point of the slip is rounded, as shown at $i$, which enables it to penetrate better in rooty soil than a point where both sides of the point are equal or square.

The base of the share A is depressed or hollowed out, as shown at $h$, from the bit of the slip to the bearing-point, where the share rests on the mold-board, for the purpose of giving a suck to the share, so that it will hold itself to the ground better, and when it strikes a stone it is not as easily thrown out.

At the end of the shank C, underneath, is a small recess, $x$, for the purpose of forcing out with a wedge in case of changing slips.

The point or slip B is not equal-sided, and hence not reversible; and in the general construction of the parts the bottom line is straight, while the upper surface is slightly curved.

Having thus fully described our invention, what we claim as new, and desire to secure by Letters Patent, is—

1. The plow point or slip B, having the shank C placed obliquely to the point, for the purposes set forth.

2. A non-reversible plow-point provided with oblique shank, in combination with a plowshare having vertical opening for the insertion of the shank, as set forth.

3. A non-reversible plow-point constructed with oblique shank C, having parallel sides, and also having bottom lines straight and top lines slightly curved, all as herein shown and described.

4. The plow point or slip B, provided with the oblique shank C, having parallel sides, in combination with the share A, having vertical slot $a$ with parallel walls, substantially as herein set forth.

5. The point and share provided with ridges $f$ and grooves $e$, made heaviest at the top, for the purposes herein set forth.

In testimony that we claim the foregoing as our own we affix our signatures in presence of two witnesses.

JAMES B. BROWN.
JOHN PENTREATH.

Witnesses as to signature of James B. Brown:
   O. B. LEWIS,
   GEO. W. JONES.

Witnesses as to signature of John Pentreath:
   H. F. ROWE,
   A. C. MOTT.